United States Patent [19]
Yuki

[11] Patent Number: 5,606,336
[45] Date of Patent: Feb. 25, 1997

[54] DISPLAY CONTROL APPARATUS

[75] Inventor: Osamu Yuki, Atsugi, Japan

[73] Assignee: Canon Kabushiki Kaisha, Tokyo, Japan

[21] Appl. No.: 432,718

[22] Filed: May 2, 1995

Related U.S. Application Data

[63] Continuation of Ser. No. 91,598, Jul. 15, 1993, abandoned.

[30] Foreign Application Priority Data

Jul. 16, 1992 [JP] Japan ................................. 4-210667

[51] Int. Cl.$^6$ .................................................. G09G 5/00
[52] U.S. Cl. ............................................ 345/1; 345/213
[58] Field of Search ........................ 345/1, 2, 3, 87, 345/94, 99, 97, 213; 358/148, 149, 158; 359/56, 54; 395/162, 153, 154

[56] References Cited

U.S. PATENT DOCUMENTS

| | | | |
|---|---|---|---|
| 4,926,166 | 5/1990 | Fujisawa et al. | 345/3 |
| 5,111,190 | 5/1992 | Zenda | 345/3 |
| 5,122,790 | 6/1992 | Yasuda et al. | 358/236 |
| 5,138,305 | 8/1992 | Tomiyasu | 345/3 |
| 5,222,212 | 6/1993 | Tohary et al. | 345/3 |
| 5,361,078 | 11/1994 | Caine | 345/1 |

FOREIGN PATENT DOCUMENTS 1207793  8/1989  Japan .

OTHER PUBLICATIONS

"Means to Synchronize Multiple Cathode Ray Tube Controllers", IBM Technical Disclosure Bulletin, vol. 34, No. 12, pp. 23 and 24 (May 1992).

*Primary Examiner*—Chanh Nguyen
*Attorney, Agent, or Firm*—Fitzpatrick, Cella, Harper & Scinto

[57] ABSTRACT

A display control apparatus permits display by a single display control apparatus on a plurality of display devices which receive image data by an internal synchronization signal. The display control apparatus outputs input image data to a plurality of display devices and includes a control circuit for selecting the longest one of the internal synchronization signals from the display devices and a unit for supplying the image data to the display devices in synchronism with the selected synchronization signal.

4 Claims, 6 Drawing Sheets

DISPLAY CONTROL APPARATUS

This application is a continuation of application Ser. No. 08/091,598, filed Jul. 15, 1993, now abandoned.

BACKGROUND OF THE INVENTION

1. Field of the Invention

The present invention relates to a display control apparatus suitable for use for a display device using a ferroelectric liquid crystal.

2. Related Background Art

A CRT (cathode ray tube) has been used as a display device for a personal computer (hereinafter referred to as PC) and a work station (hereinafter referred to as WS). However, recently, a liquid crystal display device of a TN (twisted nematic) or an STN (super twisted nematic) structure has been used in a lap-top PC because of its superiority in light weight and thinness. Further, an FLC (ferroelectric liquid crystal) has many features desirable in a display element such as a bistable memory characteristic and high response. A display device which uses such a liquid crystal attains a high resolution by the memory characteristic of the element and it has been attracting attention as a liquid display device capable of displaying in a large screen because of a simple electrode process of a matrix structure.

In order to take synchronization in supplying image data from a display control apparatus to the display device, an external synchronization method or an internal synchronization method is used depending on a characteristic of the display device. In a liquid crystal display which uses liquid crystal which responds to an effective value of an applied voltage, synchronization means for a CRT signal is provided in a display controller to share an interface of the CRT with the display controller to permit the display by the external synchronization method. A display device having a non-linear active device provided for each pixel to synchronize with the CRT signal has also been known although it has experienced difficulties in the manufacturing process.

On the other hand, a liquid crystal display device which receives image data by the internal synchronization in order to use the property of a material to a maximum extent has been known. For example, in a ferroelectric liquid crystal, a displayable horizontal scan time varies with a temperature as shown in FIG. 3. Because of such a temperature characteristic of the material, in the display device which uses the ferroelectric liquid crystal, a display temperature of glass plates which hold the liquid crystal therebetween is detected and a period of reception of the image data is controlled by the internal synchronization. The liquid crystal display device has means for setting a horizontal display timing or a liquid crystal drive voltage by using an external temperature as a parameter. A horizontal display timing for the liquid crystal response speed is supplied to the display control apparatus as a reception synchronization signal of the image data.

In demonstration of a reliability evaluation test of the display device, it may be required to simultaneously display on a plurality of display devices. In such a case, if the CRT display device receives the image data by the external synchronization, the display is attained by arranging a distributor which causes the matching of the input impedance of the display device between the display device and the display control apparatus. In the liquid crystal display device which receives the image data by the external synchronization, the display is attained by arranging a distributor having a current buffer between the display device and the display control apparatus. This distribution method permits the activation of a plurality of display devices by using one host computer having the display device.

However, in the liquid crystal display device which displays by the internal synchronization, the same number of host computers 10 to 15 as that of display devices 55 to 60 are used in the prior art system as shown in FIG. 7. In the demonstration of the reliability evaluation test of the display device, the environment parameters of the display device are stable in many cases but some variation of the environment parameters is unavoidable. Accordingly, it is difficult to drive a plurality of display devices by one host computer because of the difference in the synchronization period of the display device which varies with different environmental parameters.

FIG. 4 shows a prior art display system for displaying on one ferroelectric liquid crystal display device 20 by one host computer 30. In a flow of image data, a work station 40 first writes update image data to a video memory provided in a display control apparatus 32 upon request of draw primitive. Then, the display control apparatus 32 is supplied with a horizontal synchronization signal shown in FIG. 5 from a display controller 21 built in the display device 20, and supplies image data d (a scan address e and image data f) to the display controller 21 at a timing shown in FIG. 5 in accordance with an image data transfer clock c. A horizontal scan period h of the horizontal synchronization signal a is determined by a temperature sensor 22 mounted on the glass plates which hold the liquid crystal element therebetween. The scan line address e and the image data f are discriminated by an address/data identification signal. A difference between the image data and the horizontal scan period h is adjusted by a period g.

The image data f transferred to the display controller 21 is divided into odd and even pixel data which are supplied to segment drivers 23 and 24. Then, the segment drivers 23 and 24 apply appropriate voltages to segment electrodes of matrix structure electrodes of a liquid crystal panel 26. This voltage causes a potential difference from a voltage applied to a common electrode from a common driver 25 to drive the liquid crystal element.

In this manner, the display by the display device 20 which displays by internal synchronization is attained. Accordingly, for the simultaneous display by the plurality of display devices, a plurality of display control apparatus 32 for synchronously supplying image data and a plurality of work stations 40 are used for the horizontal synchronization signals of different periods.

Since the ferroelectric liquid crystal has the property of the response time to the temperature as shown in FIG. 3, a method has been known in which the horizontal display timing corresponding to the response time of the liquid crystal is supplied to the display control apparatus using the temperature as a parameter, as a synchronization signal of the image data transfer. In this display method, the synchronization period for the image data transfer from the display device to the display control apparatus is controlled in accordance with the environmental temperature. In this case, if the supply period for one scan of image data supplied from the display control apparatus to the display device is longer than the period of the synchronization signal supplied from the display device, a loss of the image data occurs in the received data and a predetermined image is not displayed. On the other hand, if the supply period of one scan of image data supplied from the display control apparatus to the display device is shorter than the period of the synchronization signal supplied from the display device, a drive voltage in a period other than the draw period on the liquid crystal may be set to a common voltage to improve a contrast to some extent. Accordingly, the supply period of one scan of image data supplied from the display control apparatus to the display device must be shorter than the period of the synchronization signal supplied from the display device.

SUMMARY OF THE INVENTION

It is an object of the present invention to attain the simultaneous display of a plurality of display devices operated by internal synchronization by one display control apparatus without trouble under a substantially stable environment.

In order to achieve the above object, the display control apparatus of the present invention outputs input image data to a plurality of display devices, and comprises means for selecting a longest one of the internal synchronization signals from the respective display devices and means for supplying image data to the respective display devices in synchronism with the selected synchronization signal.

DETAILED DESCRIPTION OF THE PREFERRED EMBODIMENTS

An embodiment of the present invention is explained with reference to the drawings.

Figure 1:
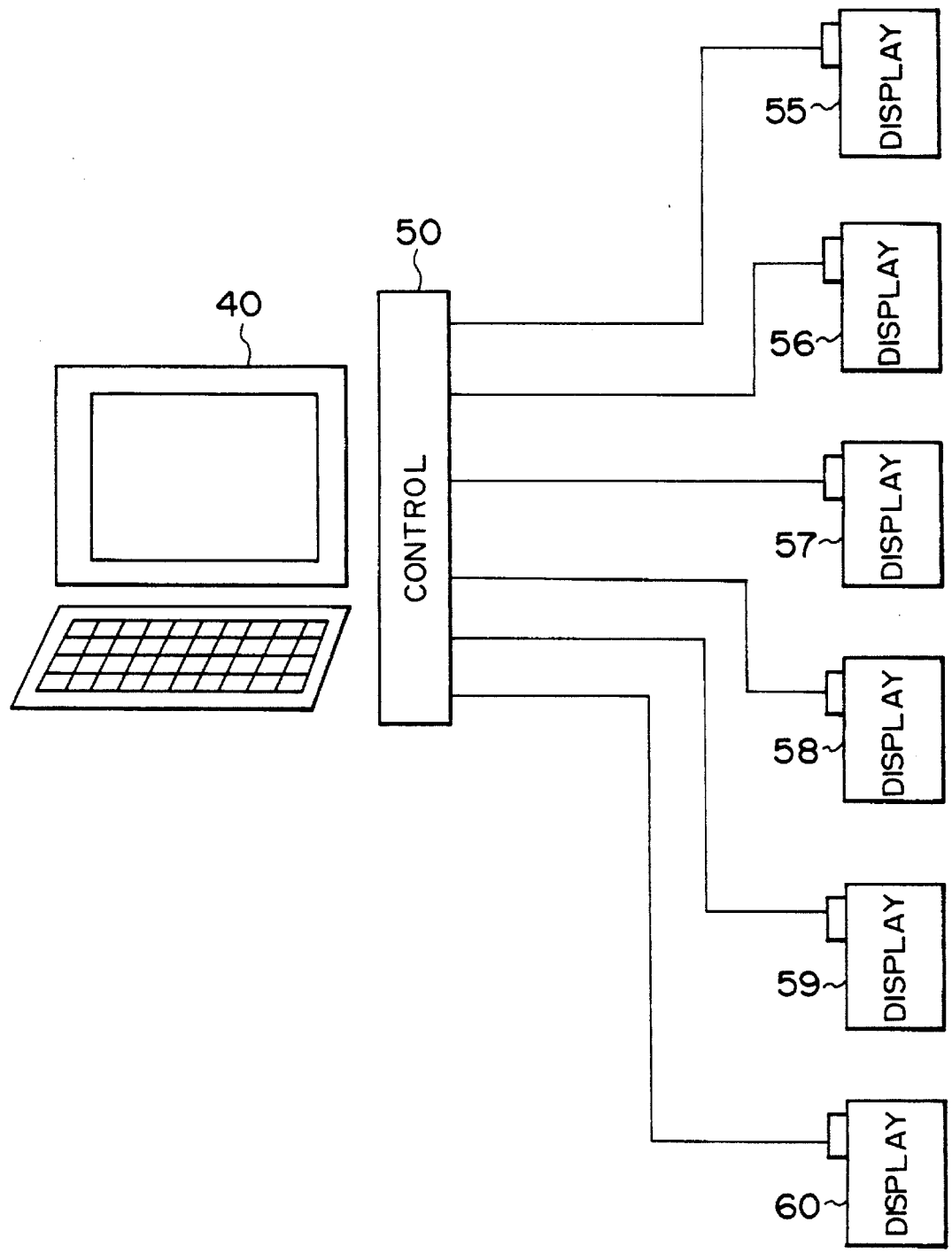
FIG. 1 shows a block diagram of a configuration of a display system including a display control apparatus and a display device in accordance with one embodiment of the present invention.

FIG. 1 shows a block diagram of a configuration of a display system using a display control apparatus in accordance with one embodiment of the present invention. The system comprises a computer 40 such as a work station, a display control apparatus 50 and ferroelectric liquid crystal display devices 55 to 60. The display control apparatus 50 is provided on a mother board or an expansion bus of the computer 40. The ferroelectric liquid crystal display devices 55 to 60 are connected with the display control apparatus 50 by a plurality of wires.

Figure 2:
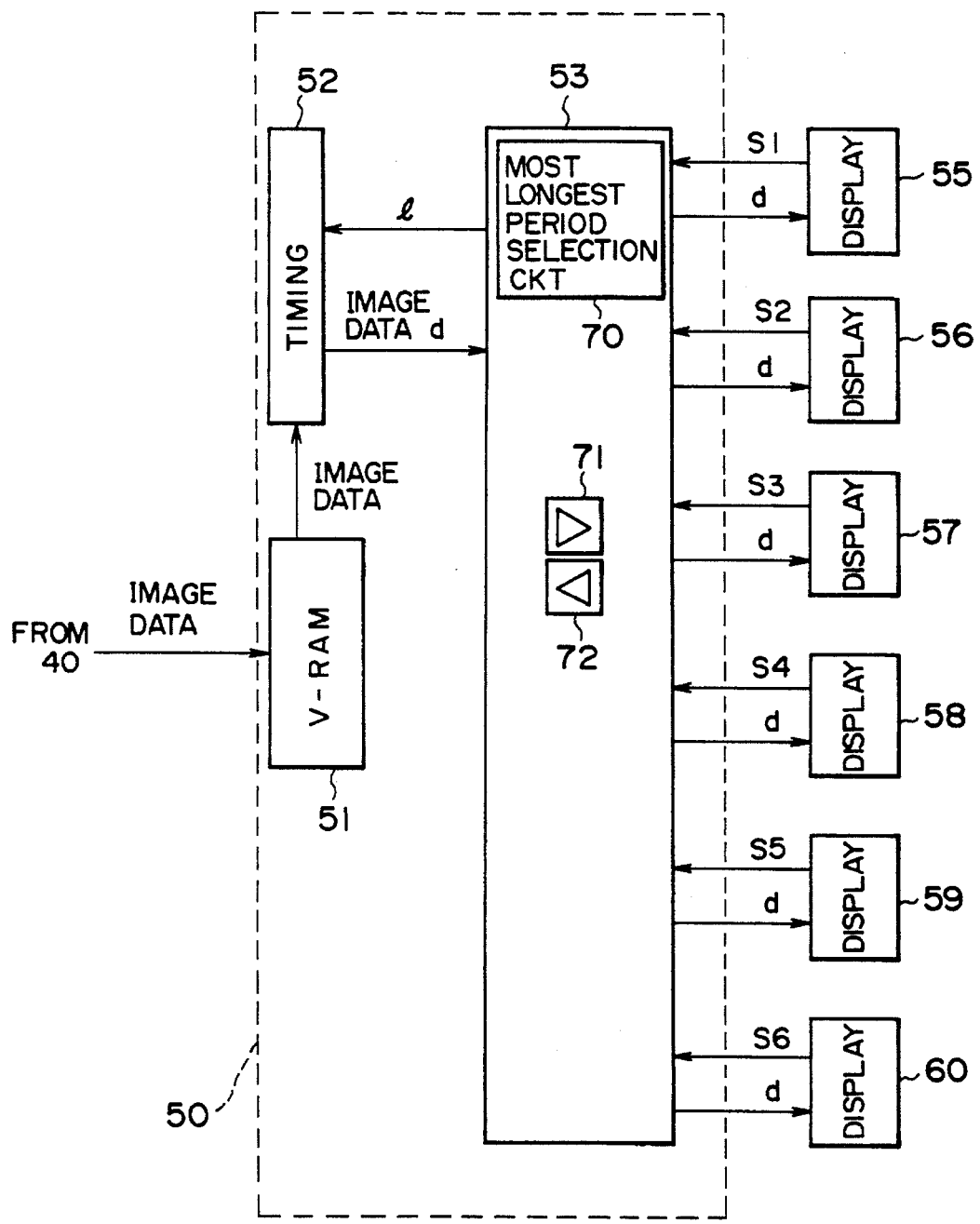
FIG. 2 shows a block diagram of a configuration of the display control apparatus of FIG. 1 and signals between the display control apparatus and the display device.
Figure 3:
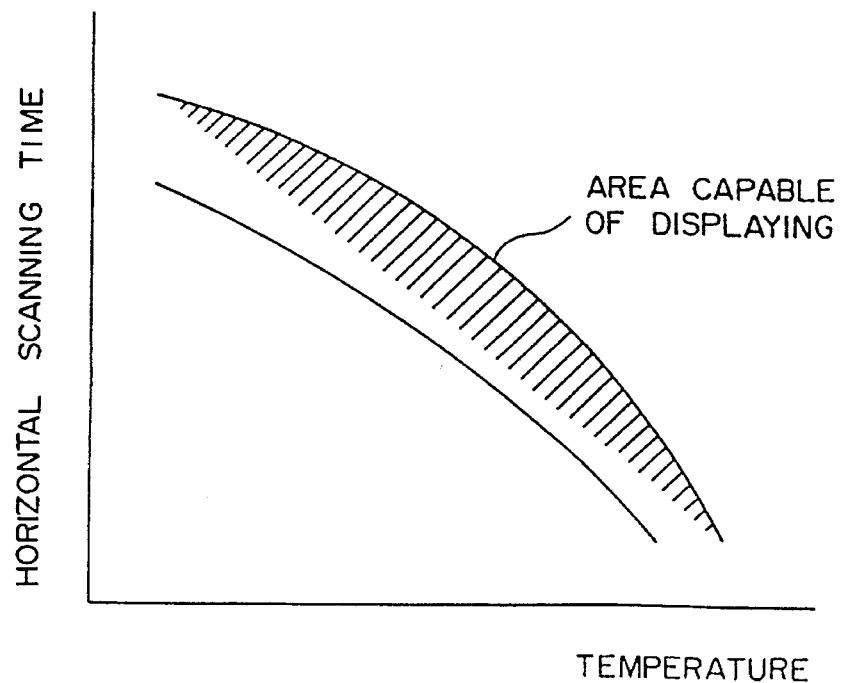
FIG. 3 shows a graph of a temperature characteristic of a display device using a ferroelectric liquid crystal.
Figure 5:
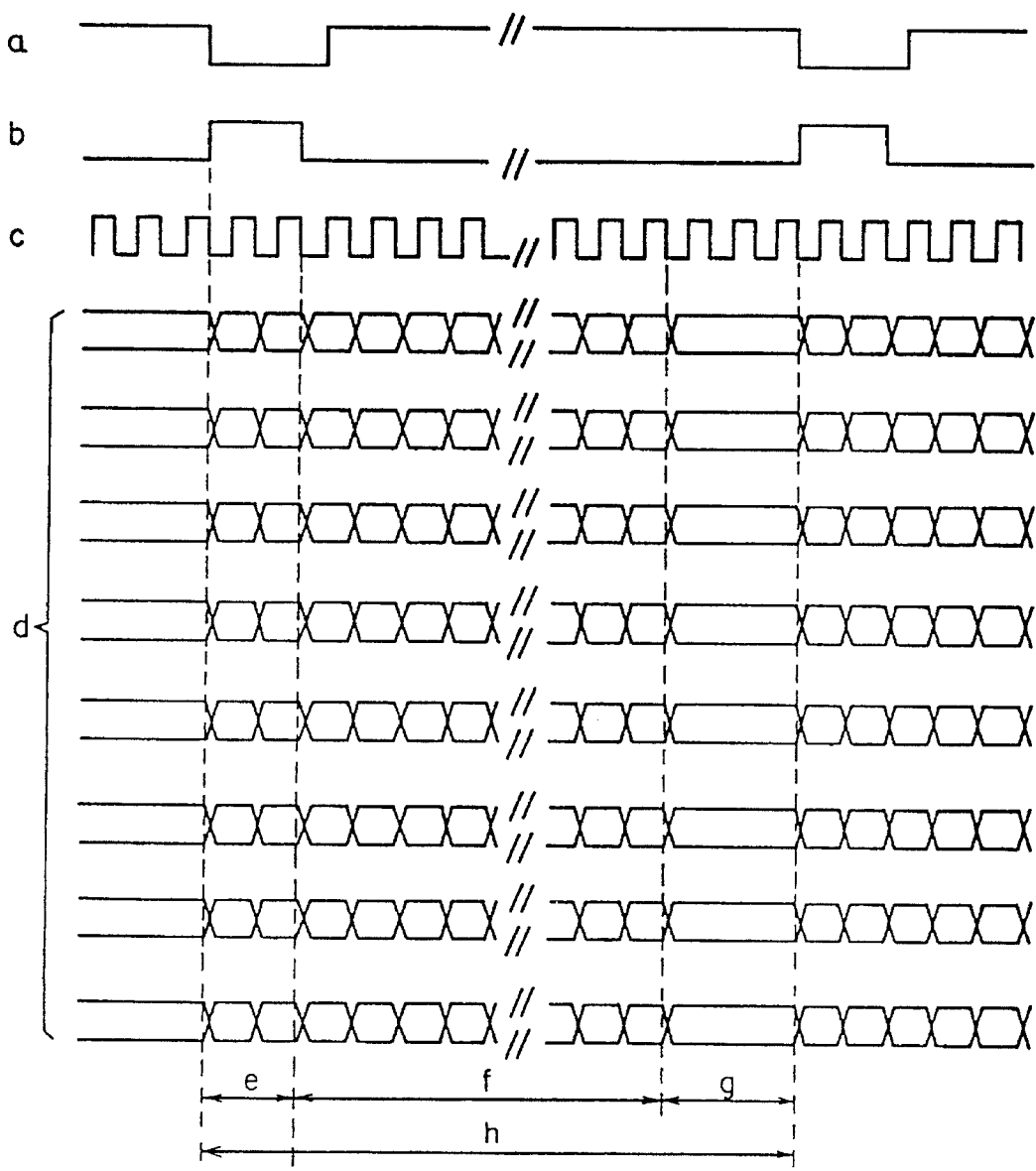
FIG. 5 shows a timing chart of signals in the apparatus and devices of FIGS. 1 and 2.

FIG. 2 shows a block diagram of a configuration of the display control apparatus 50. As shown in FIG. 2, the display control apparatus 50 comprises a set of video memories 51 for storing image data requested to the work station 40 from a client or a draw primitive, a circuit 53 for selecting a signal having the longest duration from horizontal synchronization signals supplied from a plurality of display devices 55 to 60 and a video timing circuit 52 for supplying image data d to the display devices 55 to 60 at a timing shown in FIG. 5 in synchronism with the longest duration signal 1 selected by the circuit 53. Numerals 71 and 72 denote conventional current buffer IC's for relaying currents of the image data and the control signal.

Figure 4:
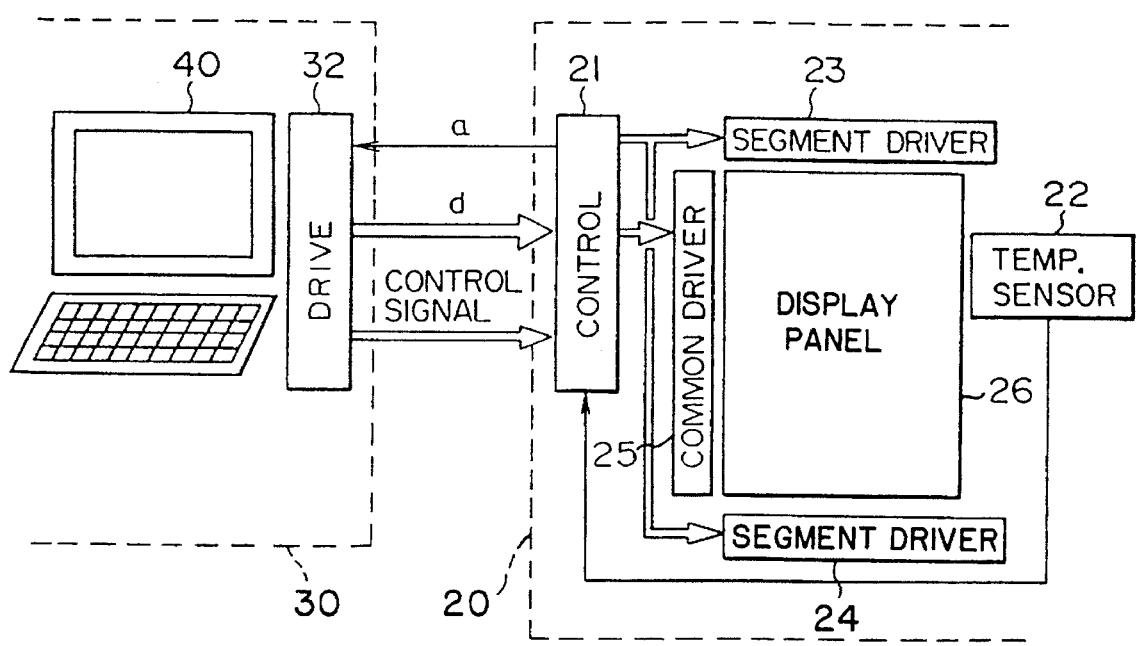
FIG. 4 shows a block diagram of a configuration of a prior art display system and a configuration of the display device of FIG. 1.

The display devices 55 to 60 have the same construction as that of the display device 20 shown in FIG. 4. The image data supplied to the display devices 55 to 60 is applied to segment drivers 23 and 24 as drive waveforms shown in FIG. 6 by a display controller 21. C55 to C60 denote common drive waveforms in the display devices 55 to 60 and S55 to S60 denote segment drive waveforms (black) in the display devices 55 to 60. One horizontal synchronization period T is determined by the display controller 21 in accordance with temperature information from a temperature sensor 22 provided on a glass of a liquid crystal panel 26.

Figure 6:
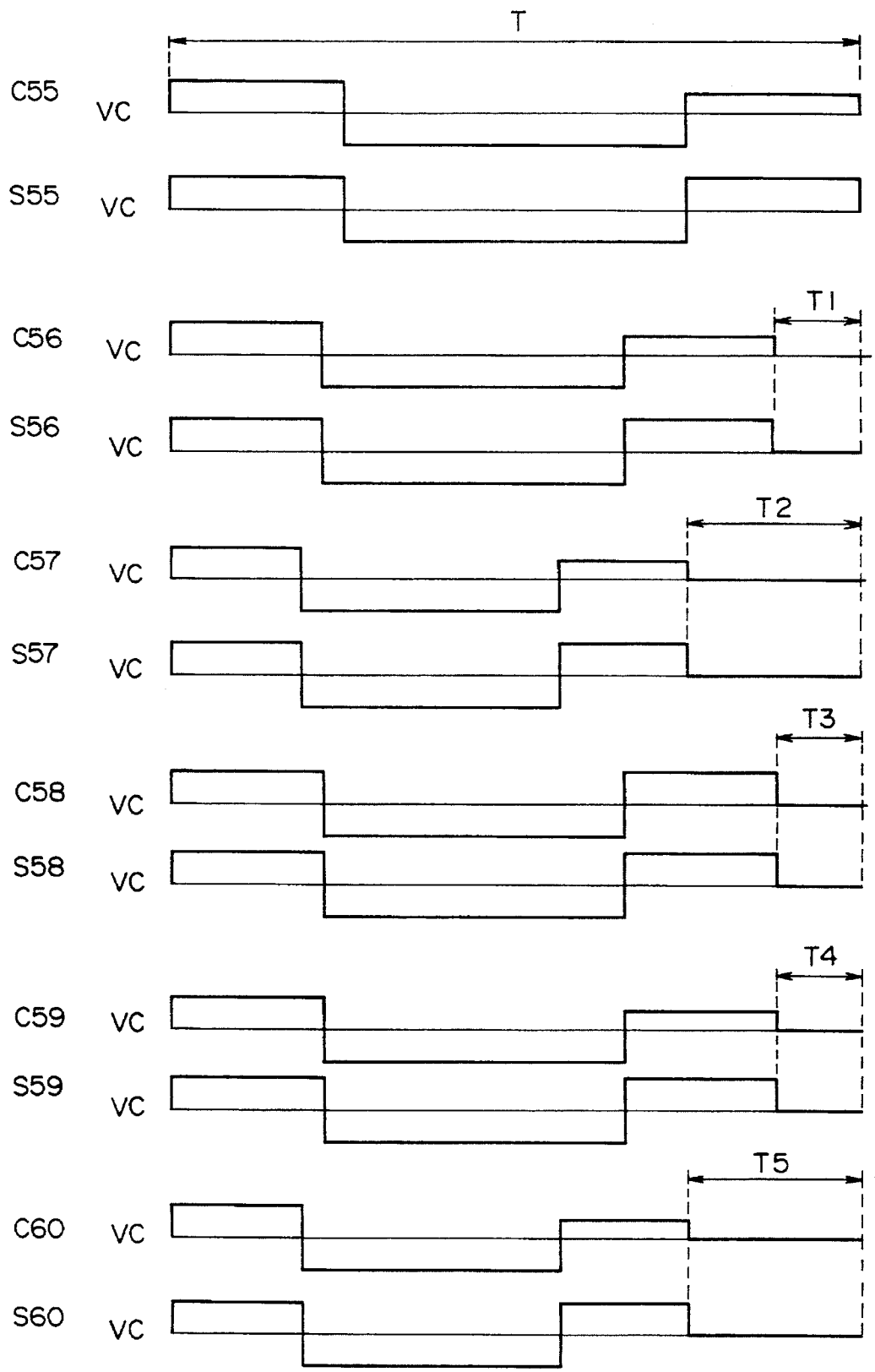
FIG. 6 shows a timing chart of drive waveforms to be supplied to a segment driver and a common driver by a display controller in the display devices of FIGS. 1 and 2.
Figure 7:
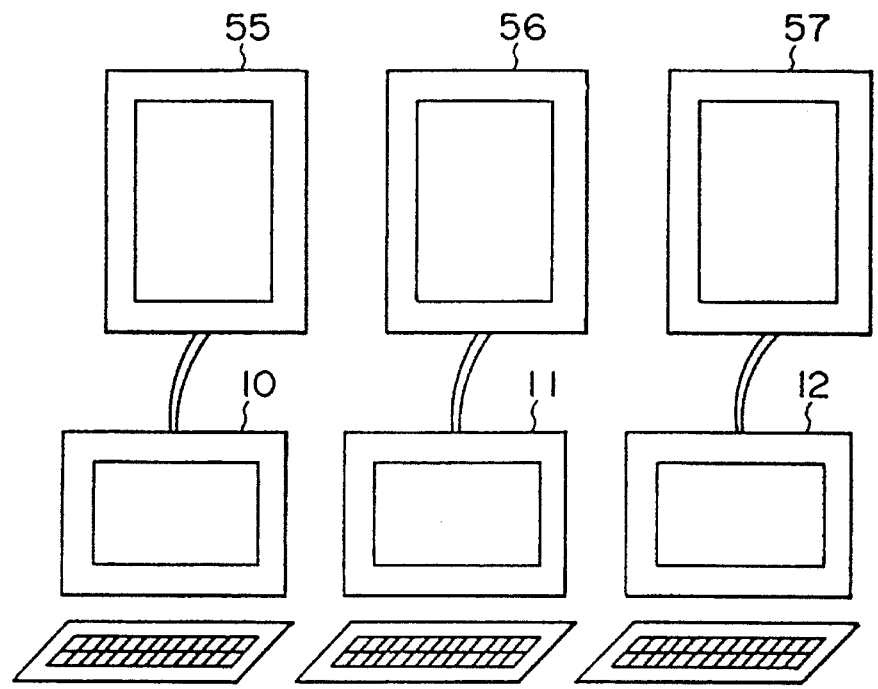
FIG. 7 shows a system configuration for displaying on a plurality of display devices by using a prior art display control apparatus.
Figure 7:
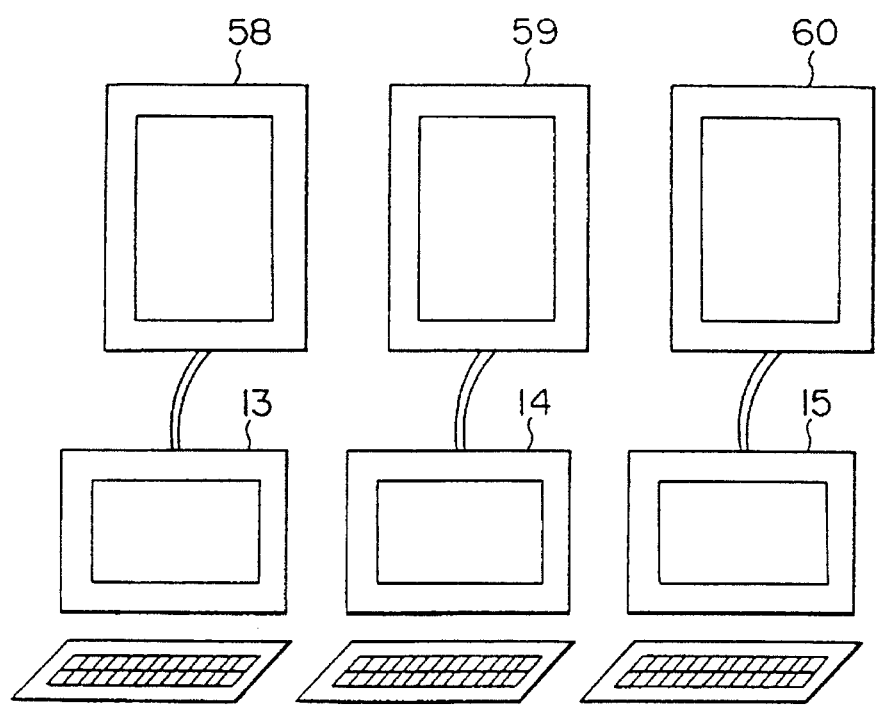

In the above configuration, the display control apparatus 50 selects the longest duration signal from the horizontal synchronization signals S1 to S6 from the display devices 55 to 60 and supplies image data d to the display devices 55 to 60 in accordance therewith. In FIG. 6, the term T of the horizontal synchronization signal supplied from the display device 55 is shown as a longest one. As a result, adjustment periods T1 to T5 are created in the display devices 55 to 60. During the adjustment periods T1 to T5, a common voltage (VC) is supplied to the segment drivers 23 and 24 and the common driver 25. When the drive voltage is the common voltage (VC), the liquid crystal is not driven. The ferroelectric liquid crystal has a memory property in the behavior or molecules and hence the display is retained during the period of the application of the common voltage.

The display control apparatus 50 normally supplies the image data of the display panel 26 to the respective display devices without the adjustment period as shown by the drive waveforms C55 and S55 of the display device 55. When the adjustment periods T1 to T5 are included in the drive waveforms, a contrast is somewhat enhanced. This is not disadvantageous in the demonstration of the display device. In the reliability evaluation test of the display device which is conducted under a substantially stable condition, the adjustment periods T1 to T5 are not included or in the order of one slot. Accordingly, by the use of the display control apparatus of the present embodiment, installation space is saved, cost is reduced and the display on the plurality of display devices which receive the image data by the internal synchronization is attained.

A longest duration selector 53 shown in FIG. 2 may be separated from the display control apparatus 50 and used as a multi-drive unit for the display device. In this case, the longest duration selection circuit 70 may be used in place of a synchronization signal generator and manually operated.

In accordance with the present invention, since the image data is supplied to the respective display devices in synchronism with the longest one of the internal synchronization signals from the respective display devices, the supply period of one scan of image data supplied from the display control apparatus to the respective display devices is shorter than the period of the synchronization signal supplied from the display control apparatus. Accordingly, the image data can be simultaneously supplied to the plurality of display devices without loss of image data. In the present invention, the property of the liquid crystal and the margin in the drive condition are utilized to permit the simultaneous display on the plurality of display devices by one display control apparatus under the substantially stable environment.

Thus, even when the display device is a type which receives the image data from the display control apparatus by the internal synchronization, the same image can be displayed on the plurality of display devices under the substantially stable environment with a simple construction and without a number of expensive host computers. Thus, the cost is reduced. Further, since the host computer can be installed in a limited space, space is saved.

As described above, by using one host computer and the display control apparatus under the substantially stable operation environment, the image can be displayed without trouble on the plurality of display devices which receive the image data by the internal synchronization.

The numerals used to designate the elements used in the drawings of the embodiment of the present invention are summarized, as follows:

10 to 15, 30: computers having display control apparatus; 20, 55 to 60: display devices; 21: display controller; 22: temperature sensor; 23, 24: segment drivers; 25: common driver; 32, 50: display control apparatus; 40: computer; 51: video memory; 52: video timing circuit; 53: longest duration selector; 70: longest duration selection circuit; 71, 72: current buffers; S1 to S6: horizontal synchronization signals; and T1 to T5: adjustment periods.

What is claimed is:

1. A display system, comprising:

an image data generator for generating image data;

a single display control means for controlling the image data generated by said generator; and a plurality of display devices each having a memory function and each outputting to said display control means a horizontal synchronizing signal using, as a synchronizing signal for image data transferring, a horizontal display timing according to a temperature change therein, with the horizontal synchronizing signal having a horizontal scan period that changes according to the temperature change, wherein the horizontal synchronizing signal of a maximum period is selected from the horizontal synchronizing signals outputted from said plurality of display devices to said single display control means, the image data transferring is performed according to the horizontal synchronizing signal of the maximum period, and the display device generating the horizontal synchronizing signal of a shorter period than the maximum period is driven in a manner that output voltages to a common driver and a segment driver are made at the same voltage, thereby performing display on said plurality of display devices based on the same image data simultaneously.

2. A display system according to claim 1, further comprising a ferroelectric liquid crystal formed in each said display device.

3. A display system according to claim 1, further comprising a temperature sensor in each said display device.

4. A display system according to claim 1, wherein said generator generates pictorical image data.

* * * * *

UNITED STATES PATENT AND TRADEMARK OFFICE
CERTIFICATE OF CORRECTION

PATENT NO. : 5,606,336
DATED : February 25, 1997
INVENTOR(S) : Yuki

It is certified that error appears in the above-identified patent and that said Letters Patent is hereby corrected as shown below:

Title page, item

[56] REFERENCES CITED:

U.S. PATENT DOCUMENTS, "5,222,212  6/1993  Tohary et al." should read --5,222,212  6/1993  Johary et al.--.
FOREIGN PATENT DOCUMENTS, "1207793  8/1989  Japan" should read --1-207793  8/1989  Japan--.

SHEET 2:

FIG. 2., "MOST" should be deleted.

COLUMN 6:

Line 32, "pictorical" should read --pictorial--.

Signed and Sealed this

Twenty-first Day of October 1997

Attest:

BRUCE LEHMAN

Attesting Officer         Commissioner of Patents and Trademarks